United States Patent [19]

Bailey et al.

[11] Patent Number: 4,544,876

[45] Date of Patent: Oct. 1, 1985

[54] VOLTAGE REGULATOR

[75] Inventors: William L. Bailey, Phoenix; William J. Kaszeta, Mesa, both of Ariz.

[73] Assignee: Solavolt International, Houston, Tex.

[21] Appl. No.: 562,367

[22] Filed: Dec. 16, 1983

[51] Int. Cl.$^4$ ............................................... G05F 1/46
[52] U.S. Cl. ................................... 323/282; 323/906; 320/35
[58] Field of Search .................... 323/282–284, 323/906, 285; 361/26, 32, 34, 105, 124, 18; 320/35, 36; 219/511, 512; 337/107

[56] References Cited

U.S. PATENT DOCUMENTS

| | | | |
|---|---|---|---|
| 3,113,255 | 12/1963 | Eberts | 320/36 |
| 3,718,839 | 2/1973 | Conti et al. | 361/105 X |
| 3,935,525 | 1/1976 | Elson et al. | 320/35 |
| 4,044,348 | 8/1977 | Huebscher | 337/107 X |
| 4,136,309 | 1/1979 | Galberth et al. | 323/906 X |

Primary Examiner—Peter S. Wong
Attorney, Agent, or Firm—John A. Fisher

[57] ABSTRACT

A voltage regulator is disclosed for regulating the voltage supplied by an energy source such as a photovoltaic array. The regulator includes a thermally activated switch which is coupled in series between the regulator input and output. A control circuit monitors the voltage supplied to a load and generates a control signal which is responsive to the measured to the load voltage. A heater, responsive to the control voltage, is positioned near the thermally activated switch and causes the switch to open when the sensed voltage rises above a prescribed limit. Hysteresis in the voltage regulator is provided by thermal insulation which retards the dissipation of heat from the vicinity of the switch causing the switch to remain open.

6 Claims, 1 Drawing Figure

U.S. Patent
Oct. 1, 1985
4,544,876
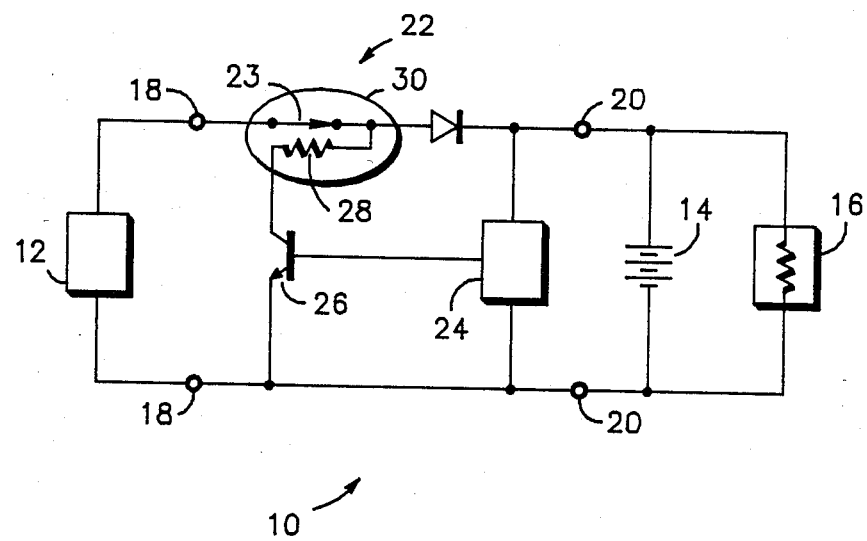

VOLTAGE REGULATOR

BACKGROUND OF THE INVENTION

This invention relates generally to a voltage regulator, and more particularly to a voltage regulator including a thermally activated switch.

Voltage regulators are used to limit the voltage level supplied by an energy source to a load. For example, a voltage regulator is used to limit the voltage to which a battery is charged by a source such as a photovoltaic array. Without the regulator, the battery could be overcharged and damaged.

Regulators are generally classified as either series type or shunt types with the name derived from whether the active element of the regulator is in series with the source or in parallel with the source. The active element of the regulator may be either a linear or a switching device. In the former, a suitable feedback circuit controls the active element which regulates the output of the source to the load and limits the output to a controlled range. For example, in charging a battery, the linear regulator regulates the output to the battery and keeps the battery at a "float" voltage. The active device in a switching regulator is either fully off or fully on and has the advantage, over the linear regulator, of significantly lower power dissipation. A switching regulator is thus usually preferred.

A shunt regulator usually has a power dissipation advantage over a series regulator because the active series element of a series regulator dissipates power at all times power is delivered to the load. This disadvantage of a series regulator, however, essentially disappears if the series element has a low resistance, such as is characteristic of a simple switch. A series regulator is preferred in some applications because such a regulator does not require shorting out the source as does a shunt regulator. Shorting out the source can be a significant problem with photovoltaic arrays, especially at high voltages, and may be prohibitive with other power sources. For the foregoing reasons, voltage regulators are preferably of the switching series type with a low impedance active element in series with the source.

One type of series element used in this type of regulator is an electromechanical relay. The electromechanical relay has the low impedance required of the switching element, in comparison to, for example, semiconductor devices, but electromechanical relays have a very limited lifetime. Such relays are typically limited to $10^5$–$10^6$ switch cycles. In a battery charging application, to insure that the electromechanical switching element lasts as long as the ten year expected lifetime of the battery, the relay must therefore be limited to an average switching rate of 1 per 2 hours to 1 per 10 minutes. In a typical battery charging application, a control circuit removes the battery charging current when the voltage at the battery reaches a predetermined overvoltage level. The battery again starts charging when the battery voltage drops to some lower voltage value. This type of cycle requires one opening and one closing of the switching element. A fully charged battery, however, will cycle under these conditions in a matter of seconds. To prolong the lifetime of the regulator, additional circuitry must be used to reduce the switching rate of the electromechanical relay. The additional circuitry, of course, adds to the cost of the regulator and adversely affects the reliability of the regulator.

A need therefore existed for a regulator which would overcome the foregoing problems to provide an inexpensive and reliable regulator.

It is therefore an object of this invention to provide an improved thermally activated voltage regulator.

It is a further object of this invention to provide an improved voltage regulator for use with a photovoltaic array.

BRIEF DESCRIPTION OF THE INVENTION

The foregoing and other objects and advantages of the invention are achieved through the use of a regulator including a thermomechanical switch and a heater element. The regulator controls the voltage supplied by an energy source to a load. The inputs of the regulator are coupled to the energy source and the output is coupled to a load. A thermally activated switch is coupled in series between the input and the output. A control circuit senses the voltage supplied to the load and generates a control signal when the voltage level exceeds a predetermined value. The control signal causes the heating of a heater element, which in turn causes the thermally activated switch to open, interrupting the supply of energy to the load. After a selected time interval the thermally activated switch cools sufficiently to close and allows energy to again be supplied to the load.

BRIEF DESCRIPTION OF THE DRAWINGS

The sole FIGURE schematically illustrates one embodiment of a voltage regulator and regulated photovoltaic array in accordance with the invention.

DETAILED DESCRIPTION OF PREFERRED EMBODIMENTS

The sole FIGURE illustrates schematically a regulator 10 in accordance with the invention. For purposes of illustration, the regulator is depicted in an embodiment in which a photovoltaic array 12 is being used to charge a battery 14 and to supply a load 16. More specifically, particular reference is made to the operation of the voltage regulator in an application to charge a nominal 12 volt battery. These examples are used by way of illustration only, and not by way of limitation of the invention. Application to other systems and to other voltage ranges will be readily apparent to those skilled in the art.

The regulator includes input terminals 18 across which the photovoltaic array is coupled and output terminals 20 across which the battery and load are coupled. The regulator is of the series type having an active element 22 coupled in series between the input and output. In accordance with the invention, active element 22 includes a thermomechanical switch 23 which opens in response to a control signal to interrupt the charging of battery 14.

The control circuit 24 monitors the voltage at the output of the regulator and generates a control signal when that voltage exceeds a prescribed value. Control circuit 24 is well-known in the art and can be a circuit, for example, such as the control circuit described in co-pending application Ser. No. 431,934 filed Sept. 30, 1982, the contents of which are incorporated herein by reference. When the voltage at the regulator output reaches a preselected value, control circuit 24 generates a control voltage to turn on transistor 26. Transistor 26 is coupled in series with resistor 28, in parallel with the input of the regulator, but on the output side of switch 23. When transistor 26 is turned on, current flows through resistor 28. Heat generated by the flow of current through resistor 28 causes the thermally activated switch 23 to open, interrupting charging of battery 14. Resistor 28 and switch 23 are in close thermal contact and are both surrounded by thermal insulating material 30. Thus, both the resistor and the switch are heated to a temperature sufficient to cause the switch to open. Opening of switch 23 interrupts the battery charging current and the flow of current through resistor 28 and thus the heating of resistor 28. The thermal insulation causes the switch and resistor to cool slowly, and during this cool-down time the battery voltage falls. When the control circuit senses that the voltage at the regulator output has dropped below a second preselected voltage level the control signal driving transistor 26 drops, allowing transistor 26 to turn off. The dropping of the voltage at the regulator output and the turning off of transistor 26 normally take only a few seconds. Switch 23 remains open, however, for a preselected time, which can be a number of minutes, because of the thermal insulation about the switch which reduces heat dissipation. When the temperature of the switch falls sufficiently, the switch recloses and the cycle starts again.

Blocking diode 35 isolates the load from the regulator and prevents the discharge of the battery through resistor 28 and transistor 26. For a 12 volt system, resistor 28 can have a value of about 40 ohms and draw about one-half amp. Switch 23 is preferably a snap action bimetallic disk switch having an "open" temperature of about 120° C. and a "close" temperature of about 75° C. Such a switch takes from a few seconds to a few minutes to open after the heating begins, depending on the amount of insulation surrounding the switch and resistor. The amount of insulation determines the length of time that the switch stays open. Preferably, the switch stays open for about 10 minutes. Control circuit 24 generates a control signal when the voltage supplied to battery 14 exceeds about 14.4 volts. Generation of the control signal stops when the voltage drops to about 13.4 volts.

In one particular embodiment, four resistors, each 10 ohm, 5 watt, were series connected to form heating resistor 28. The four resistors were positioned to surround switch 23, in close thermal contact with the switch. The switch was a bimetallic, snap action switch as described above. The switch and resistors were thermally insulated by encasing them in a cavity formed in two pieces of styrofoam insulation. The insulation was about 2 cm in thickness and 6 cm on a side. Used in a nominal 12 volt system, the switch cycled every 12 minutes, with four minutes required for the switch to open and then eight minutes for the switch to reclose.

Heater resistor 28 draws only about $\frac{1}{2}$ of an amp at 12 volts and uses only "surplus" power from the array. The only time power is dissipated by resistor 28 is during that time period when the voltage supplied to the battery has already reached its preselected high value. No current flows through resistor 28 while power is being supplied to charge the battery to that maximum value. Switch 23 is selected to have a very low impedance in the closed state so that the only useful power which is consumed by the regulator is the power necessary to operate control circuit 24.

The regulator in accordance with the invention is highly reliable. The reliability results from several factors. Among these factors, the snap action, inherent in the preferred thermally activated switch, is very effective in making and breaking high currents. The snap action is obtained by heating and cooling a bimetallic disk. This action is much more simple and more reliable than an electromechanical relay which may become stuck in one position or have a short or open circuit in its activating coil. The thermally activated switch is also more simple and more rugged than a solid state switching device, and in addition has a much lower impedance in the conducting state. In a solid state regulator the series element is a device such as a transistor or SCR and the solid state device must handle the maximum charging current. In contrast, in the regulator in accordance with this invention, the maximum current carried by any solid state device is the one-half ampere or less carried by transistor 26.

A further reason for the increase in reliability of the regulator in accordance with the invention, in comparison with regulators employing electromechanical relays, is the lower overall parts count. When using an electromechanical relay, some other circuitry must be employed to increase the time between switchings to the 10 minutes or so minimum required to obtain the necessary lifetime for the regulator. The additional required timing circuitry decreases the overall reliability of the circuit.

Thus it is apparent that there has been provided, in accordance with the invention, an improved regulator which fully meets the objects and advantages set forth above. Although the regulator has been described and illustrated by reference to specific embodiments thereof, it is not intended that the invention be so limited. Those skilled in the art will recognize that changes in form and detail may be made therein without departing from the spirit and scope of the invention.

We claim:

1. A voltage regulator comprising: an input for coupling to an energy source and an output for coupling to a load; a thermally activated switch having a first end coupled to said input and a second end coupled to said output; a control circuit for sensing voltage level supplied to said load and for generating a control signal responsive to the voltage level sensed; a resistor positioned proximate said switch and coupled to said second end for heating said thermally activated switch in response to said control signal and causing said switch to open; a transistor in series with said resistor for driving current through said resistor, said resistor and transistor coupled in parallel across said output, and said transistor coupled to said control circuit for receiving said control signal; and insulating means disposed about said switch to keep said switch open for a predetermined time after said control signal is removed.

2. The voltage regulator of claim 1 further comprising a blocking diode in series with said switch.

3. A voltage regulator comprising: an input for coupling to an energy source and an output for coupling to a load; a thermally activated switch coupled in series in one line between said input and said output, said switch having an input side and an output side; control means for sensing voltage level supplied to said load and for generating a control signal responsive to said voltage level sensed; heating means responsive to said control signal coupled in parallel with said output to heat said switch and cause said switch to open, said heating means comprising a resistor having one end coupled to said output side of said switch and a second end coupled to a second line coupled between said input and said output; and insulating means around said switch to limit heat dissipation from said switch and to keep said switch open for a predetermined time after said control signal is removed.

4. The voltage regulator of claim 3 further comprising a blocking diode coupled in series between said switch and said output.

5. The voltage regulator of claim 4 wherein said one end of said resistor is coupled between said switch and said blocking diode.

6. A voltage regulator for regulating the voltage supplied by a photovoltaic array to a battery which comprises: input means for coupling to said array and output means for coupling to said battery; a thermally activated switch coupled between one terminal of said input and one terminal of said output, said switch having an input side and an output side; control means for measuring the voltage level supplied at said output and for generating a control signal responsive to said voltage level; heater means for causing said switch to open in response to said control signal coupled in parallel across said output comprising a heater resistor positioned proximate said switch and having a first terminal coupled to said switch at said output side; and a transistor, said transistor having a collector coupled to a second terminal of said resistor, a base coupled to said control circuit for receiving said control signal therefrom and an emitter coupled to a second terminal of said output; and insulation surrounding said switch and capable of limiting heat dissipation from said switch and thereby causing said switch to stay open for a predetermined time after the removal of said control signal.

* * * * *